C. F. BURGESS.

HAND LAMP.

APPLICATION FILED DEC. 7, 1920.

Reissued Jan. 11, 1921. 15,022.

Inventor
Charles F. Burgess.
By his Attorneys
Pennie Davis Marvin & Edmonds

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

HAND-LAMP.

15,022. Specification of Reissued Letters Patent. Reissued Jan. 11, 1921.

Original No. 1,084,926, dated January 20, 1914, Serial No. 789,595, filed September 13, 1913. Application for reissue filed December 7, 1920. Serial No. 429,040.

*To all whom it may concern:*

Be it known that I, CHARLES F. BURGESS, a citizen of the United States, residing at Madison, in the county of Dane, State of Wisconsin, have invented certain new and useful Improvements in Hand-Lamps; and I do hereby declare the following to be a full, clear, and exact description of the invention, such as will enable others skilled in the art to which it appertains to make and use the same.

The present invention relates to portable battery lamps and more particularly to lamps adapted for carrying in the hand or in the pocket.

It is the object of the present invention to provide such an arrangement of parts that the lamp is protected against accidental lighting, and with a reflector and lens so related that the light from the lamp may be focused or may be dispersed more or less as desired, the conductive parts at that end of the lamp being adequately insulated against accidental connection with other conductive parts of the structure.

It is a further object to arrange the contact device and a removable closure for the end of the casing in such relation as to permit ready removal of the batteries, and to afford other special advantages which will be made apparent by the detailed description hereinafter given.

Figure 1:
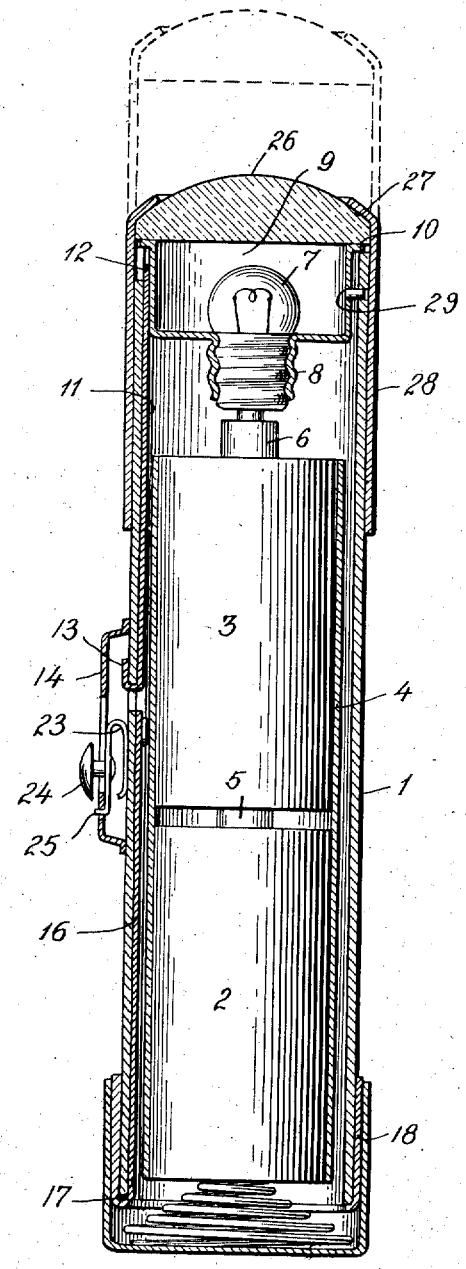
Figure 2:
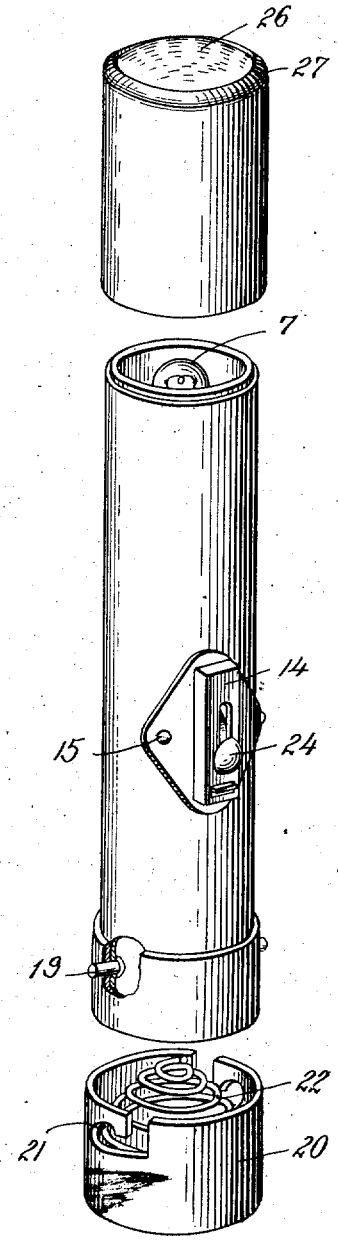

In the drawings, forming a part of this specification, Figure 1 is a sectional elevation through the complete lamp; and Fig. 2 is an exploded view showing the lens tube and the spring socket detached from the corresponding ends of the lamp casing.

In the structure illustrated, the device comprises a casing 1 of insulating material such as fiber or the like within which may be introduced a plurality of battery cells 2 and 3 inclosed in a paste board jacket 4. Cell 3 has its naked zinc container resting on the central electrode 5 of cell 2, and the central electrode 6 of cell 3 contacts with the inner terminal of the incandescent lamp 7. The outer terminal or sleeve of the lamp socket is threaded into the tubular extension 8 of the reflector 9, which is in the form of a cup with a cylindrical side wall which is turned over at the top edge to form a flange 10 seated against the adjacent end of the fiber tube 1. The reflector is electrically connected with a metal strip 11 by means of solder applied at 12 through a narrow notch cut in the end of the fiber tube 1, and this conductor 11 extends back approximately to the middle of the fiber casing and there is bent through and folded down to form a lug 13 at which electrical connection with the lamp may be established.

As a means for establishing the electrical connection to the lamp, I make use of a spring contact device not herein claimed, but claimed *per se* in Maisel Patent No. 1,082,887, issued December 30, 1913, this device comprising a housing 14 pressed up from sheet metal and having side flanges through which the rivets 15 may be passed for securing the housing to the fiber casing 1. One of these rivets may serve to establish electrical connection between this housing and a metal strip 16 extending longitudinally of the casing and terminating in a lug 17 gripped between the end of casing 1 and a flange on the edge of a metal ring 18 reinforcing the end of the casing and held in position by rivets 19 which project outward to form retaining lugs. Coöperating with these lugs and secured in position thereby is a cup-shaped socket 20, having a bayonet joint with a rounded recess 21 for locking engagement with lugs 19. This socket 20 contains a helically coiled spring 22 which normally bears against the zinc electrode of cell 2 and establishes electrical connection therewith.

With the several parts arranged as above described, there is a complete electrical circuit from the battery through the lamp, except for the gap between lug 13 and housing 14. To bridge this gap there is provided within housing 14 a sliding contact member 23 having one of its legs positioned to slide along the exterior of the fiber casing, and having its other leg bearing against the inner face of housing 14. A pin and thumb piece 24 project through a slot in housing 14 and afford a means for sliding the contact when the thumb piece is pushed inward and forward by the operator. A lock is provided to prevent accidental sliding of the contact member and consist of an outturned lug 25 on the contact member projecting through a slot in the housing member as shown in the drawings, so that sliding movement of the contactor is impossible unless the thumb piece is pushed inward at the same time it is being pushed forward. This protects the lamp against accidental lighting when slipped into or out of the pocket of the user.

The means whereby the focal length of the beam of light may be shifted includes a lens 26 cemented at 27 to the flanged end of a seamless metal cylinder 28, slidingly mounted on the fiber tube and telescoping with respect thereto to shift lens 26 with respect to lamp 7 and its reflector 9. The lens in conjunction with the cylindrical reflector and the telescoping relation of the tubes afford means for focusing the light at a short distance from the lamp or for spreading it out as a divergent beam for illuminating a wide area.

It is important that there should be no electrical connection between the lens supporting tube 28 and the reflector and other metal parts at the lamp end of the casing, and to this end the ring 10 of the reflector does not extend out as far as the exterior of the fiber tube. Similarly, the pin or rivet 29, which may be used to assist the soldered strip 12 in holding reflector 9 in the end of the casing, does not extend far enough to contact with the lens tube 28. As the result of the electrical insulation of tube 28, accidental connection of that with housing 14 will not light the lamp. In fact there is no exposed part which can be accidentally connected to any other part to cause inadvertent lighting of the lamp. This is an important feature, for it has often happened with other lamps of this general type that when placed in a box or bag with tools, or thrown into a wire mail basket, the lamp would light up with its thumb contactor open, and thus might completely wear out its batteries to no useful purpose.

I claim:—

1. In a battery hand lamp, the combination of an insulating casing, batteries and a lamp mounted therein, a focusing lens for said lamp and a tubular support for said lens and to which it is permanently attached, said support being mounted directly on the fiber tube and insulated thereby and adapted to slide thereon in changing the focus of the light from the lamp.

2. In a battery hand lamp, an insulating casing, batteries and a lamp therein, a reflector and a lens for said lamp, and a tubular support for said lens slidingly mounted on said casing to change the focus of the light, and insulated from said reflector to avoid accidental lighting of the lamp.

3. In a tubular hand lamp, the combination of a cylindrical casing, a lamp and reflector positioned at one end of said casing, a contact device near the center of said casing for establishing electrical connection through said reflector to said lamp, and a lens supporting tube slidingly mounted on said casing, and insulated from said lamp and reflector.

4. In a tubular hand lamp, the combination of an insulating casing, a battery therein comprising a plurality of cells arranged end to end, a lamp at one end of said casing, a metal closure for the other end of said casing, said closure being removable to facilitate removal of said battery through said last-named end and carrying a spring for establishing connection with one end of said battery, a reflector for said lamp connected through said lamp with the other end of said battery, stationary conductors electrically connected to and leading from said reflector and said metal closure, respectively, and terminating near the center of said casing, where their adjacent ends are spaced apart to form a switch gap, a lens for said lamp and a metal lens support enveloping said reflector and the front end of its stationary conductor and insulated from all parts of the electrical circuit, and means for closing said switch gap when the lamp is to be lighted and for housing said gap to prevent accidental bridging thereof by an extraneous conductor; thereby preventing inadvertent lighting of the lamp through accidental connection of its exposed metal parts.

5. A tubular battery lamp, comprising an insulating casing, batteries therein, a contact device carried by said casing, a metal closure for one end of said casing in electrical connection with said batteries and said contact device, a lamp at the other end of the casing, a reflector and a lens for said lamp, and a tubular support in which said lens is permanently mounted, said support being slidingly mounted on said casing and electrically insulated from the conductive parts at the lamp end of the casing.

In testimony whereof I affix my signature.

CHARLES F. BURGESS.